(12) United States Patent  
Taylor

(10) Patent No.: US 6,408,516 B1  
(45) Date of Patent: Jun. 25, 2002

(54) SUNROOF OPENING FOR VEHICLE ROOF PANEL

(75) Inventor: Joe E. Taylor, Troy, MI (US)

(73) Assignee: Shiloh Industries, Inc. Dickson Mfg. Div., Dickson, TN (US)

(*) Notice: Subject to any disclaimer, the term of this patent is extended or adjusted under 35 U.S.C. 154(b) by 0 days.

(21) Appl. No.: 09/385,314

(22) Filed: Aug. 30, 1999

(51) Int. Cl.[7] .............................................. B21D 53/88
(52) U.S. Cl. ........................... 29/897.2; 29/430; 29/557
(58) Field of Search ................................ 29/897.2, 509, 29/513, 469.5, 430, 557; 72/335, 404, 334, 379.2; 296/210, 216

(56) References Cited

U.S. PATENT DOCUMENTS

| | | | |
|---|---|---|---|
| 1,584,119 A | * 5/1926 | Moecker et al. | 72/335 |
| 3,680,910 A | * 8/1972 | Stanner | 29/513 |
| 3,755,132 A | * 8/1973 | Kolin et al. | 72/334 |
| 3,858,427 A | * 1/1975 | Euteneuer et al. | 72/334 |
| 3,909,918 A | * 10/1975 | Takizawa et al. | 29/509 |
| 3,909,919 A | * 10/1975 | Miyabayashi et al. | 29/509 |
| 3,964,784 A | * 6/1976 | Prechter et al. | 296/215 |
| 4,356,717 A | * 11/1982 | Okunishi et al. | 72/334 |
| 4,553,307 A | * 11/1985 | Kaltz et al. | 296/216 |
| 4,601,511 A | 7/1986 | Nakamura et al. | 296/210 |
| 4,728,383 A | * 3/1988 | Kaller et al. | 29/430 |
| 4,946,225 A | * 8/1990 | Jardin | 296/216 |
| 5,100,197 A | 3/1992 | Ichinose et al. | 296/216 |
| 5,203,814 A | * 4/1993 | Kushizaki et al. | 29/897.2 |
| 5,211,047 A | * 5/1993 | Kaneyuki | 72/379.2 |
| 5,267,683 A | * 12/1993 | Hamada et al. | 29/430 |
| 6,038,899 A | * 3/2000 | Nagasawa | 72/379.2 |
| 6,098,435 A | * 8/2000 | Takada | 72/379.2 |

* cited by examiner

Primary Examiner—I Cuda Rosenbaum  
Assistant Examiner—T. Nguyen  
(74) Attorney, Agent, or Firm—Young & Basile, P.C.

(57) ABSTRACT

A method of stamping and punching at several stations, an opening in a vehicle rood panel to provide for sunroof installation is described. A preformed recess is stamped into the top section of the panel to define a perimeter for a sunroof opening. The stamping of the preform comprises locating the roof panel in a stamping press beneath a press die where the die is aligned with the perimeter of the desired position for the sunroof opening. The preform recess is stamped in the panel where the preform is characterized by having a first bend which defines the opening perimeter and comprises rounded corner portions interconnected a front, rear and two side edges. A downwardly extending flange which becomes a sidewall of the sunroof opening is provided and has a length at least equal to the depth of a sealed portion of the sunroof panel and a second bend extending opposite to the first bend for interconnecting flange to the base portion of the recess. At the subsequent stations the underside surface of the flange of the preform is used to locate the panel for further processing. Preferably, at a subsequent processing station an apparatus is provided for bending lip portions of the depending flange to facilitate insertion of the sunroof. The apparatus has floating backup blocks and stacked stripper block and die block to locate the opening and effect bending of the flange without distorting the precise location of the flanges to ensure a seal with the sunroof panel installation.

6 Claims, 12 Drawing Sheets

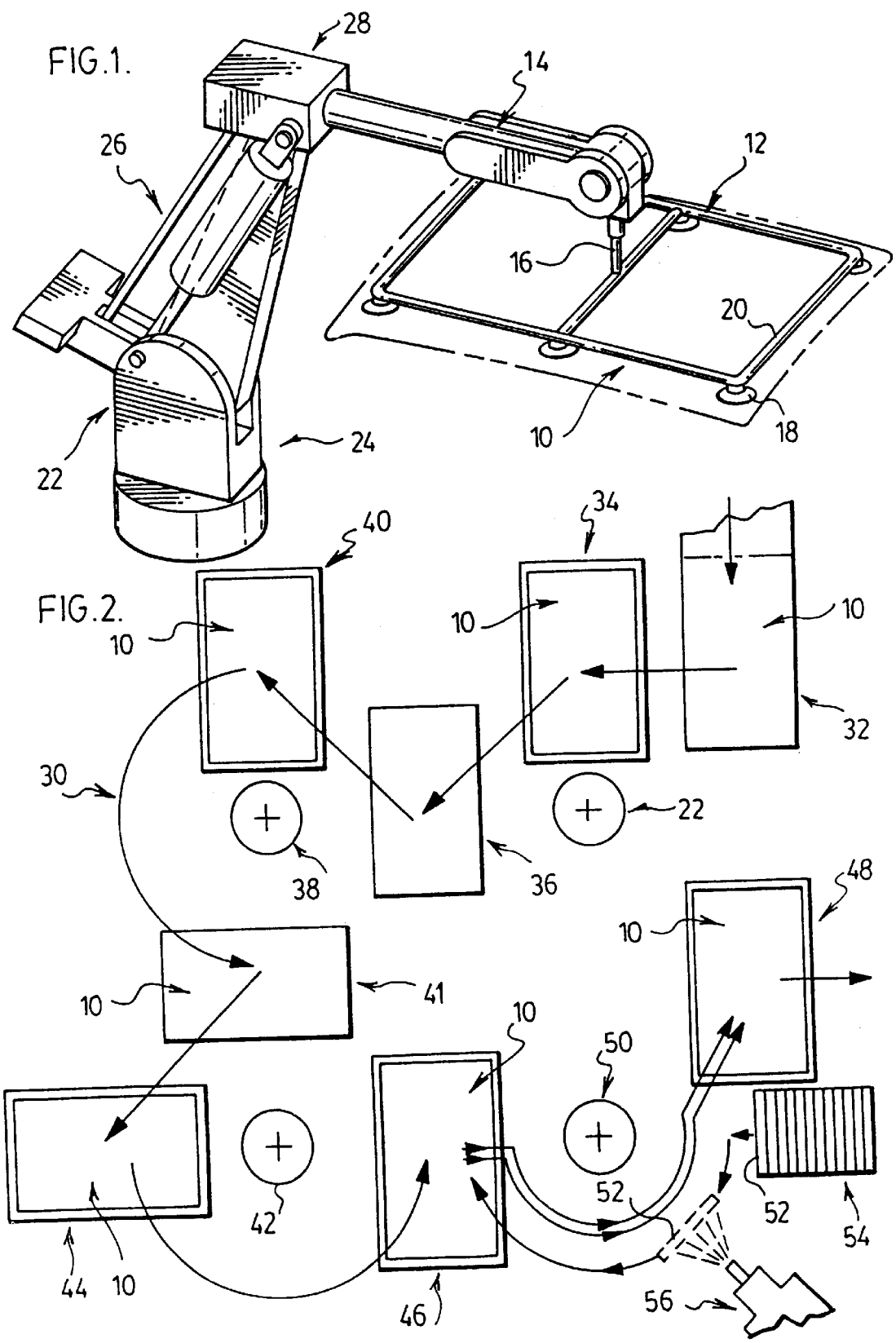

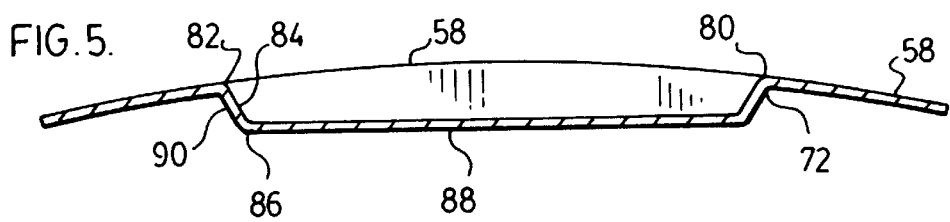
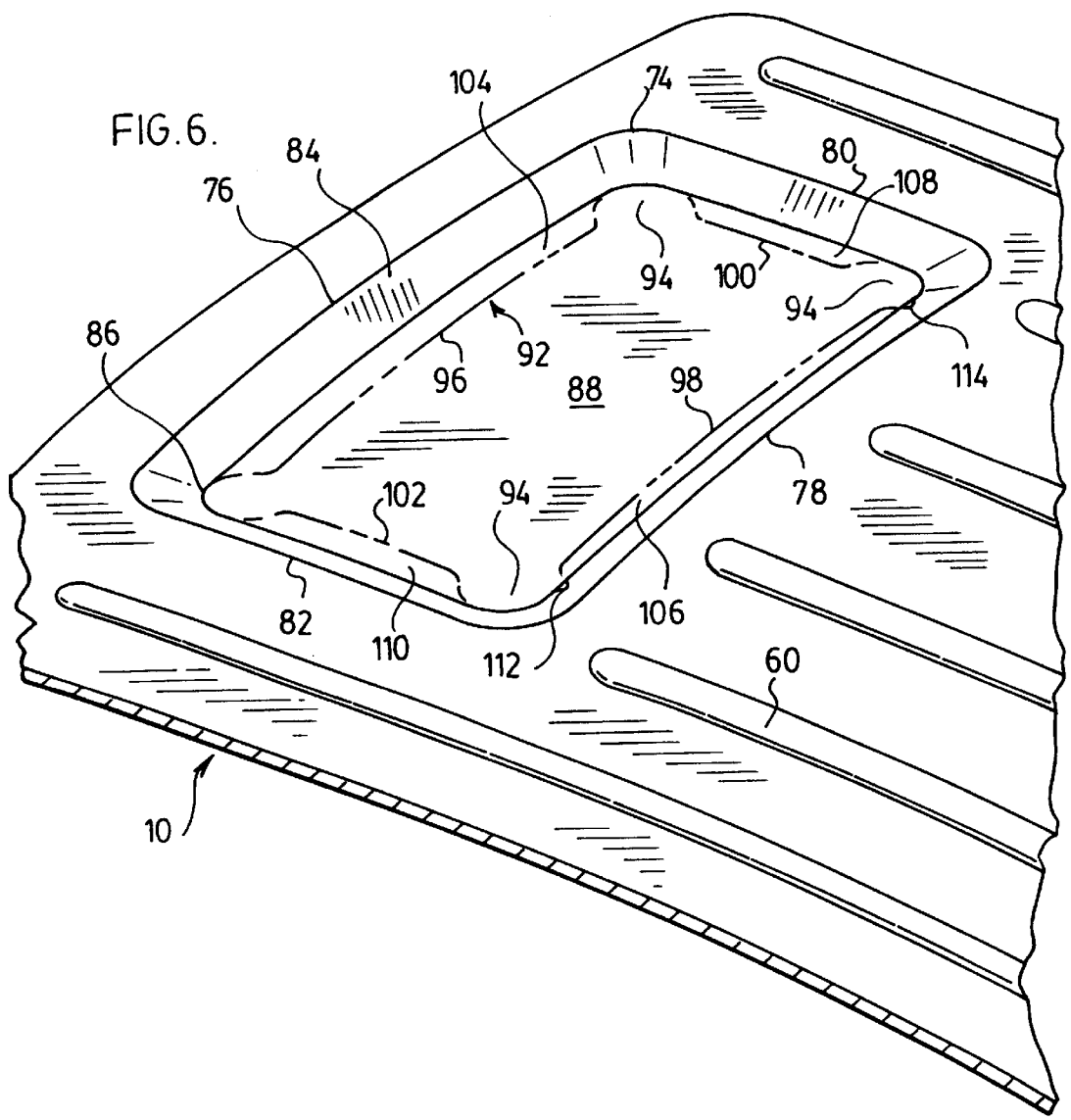

SUNROOF OPENING FOR VEHICLE ROOF PANEL

FIELD OF THE INVENTION

This invention relates to methods and apparatus for stamping and punching at several stations, a vehicle roof panel to provide an opening which facilitates sunroof installation.

BACKGROUND OF THE INVENTION

Although a sunroof in a vehicle offers considerable convenience for enjoying the outdoors compared to a convertible and also offers a luxury element to the vehicle, sunroofs are subjected to significant extremes in temperature, moisture and wind. Reliability of the sunroof can be affected. It is generally thought that factory installation of a sunroof offers the optimum fitment for the sunroof panel to ensure long time use and enjoyment.

Factory installation of the sunroof panel continues to be done by hand. The vehicle roof panel is manually manipulated for purposes of cutting out the opening for the sunroof, welding supporting structure to the underside of the panel about the sunroof opening and completion of the assembly. Usually the sunroof panel system is installed in the vehicle roof panel by two operators who manually position the assembly in the opening and secure it in place. Manual handling the roof panels can result in damaging the panels, particularly when the panels are of considerable size, such as on large luxury vehicle, sport utility vehicles and the like. That explains why only small roof panels were handled manually. With the exceptionally large sport utility vehicles, usually the sunroof installation is done after market because it is impossible for operators to properly handle panels in moving them from station to station without inducing bending and buckling in the panel contour. Furthermore, automated installation of the sunroof panel assembly in the opening of the vehicle panel is difficult to achieve because of the precision fit of the sunroof panel relative to the flanges formed in the vehicle roof panel opening.

Examples of sunroof panel assemblies are shown in U.S. Pat. No. 4,601,511. Reinforcement ribs 3 are provided in the roof panel, usually for a utility vehicle or van. The region close to the opening for the sunroof panel 2 is reinforced by the use of cross members 5 which stiffen the roof structure and prevent bucking of the roof panel. The cross member prevents bending stress, as applied to the roof panel from concentrating at the front ends of the reinforcement ribs. U.S. Pat. No. 5,100,197 describes a vehicle roof panel having a reinforcement member provided on each side of the opening. The reinforcement appears to be welded to the dependent flange of the roof panel. Components of the sunroof panel system are then secured to this welded reinforcement item. There continues to be a need for automating the manufacture of sunroof openings in large vehicle panels as well as facilitating the automation of the installation of the sunroof panel system in the opening. It has been difficult for prior art systems to address these problems because no one appears to have given thought to an integrated system which provides the opening in the vehicle panel, secures reinforcement thereto and provides a completed vehicle roof panel which is ready for securement to the balance of the frame of the vehicle and then automated installation of the sunroof panel system. Furthermore, manual handling of the panels, particularly the larger sport utility vehicle, van and pickup truck units have been avoided because of the potential of damaging the Class I surface of the panel.

SUMMARY OF THE INVENTION

In accordance with various aspects of the invention, a method of forming an opening in a vehicle roof panel is provided which minimizes or eliminates damaging of the Class I surface and as well, prepares the opening in a manner to facilitate automated installation of the sunroof panel system.

In accordance with an aspect of the invention, a vehicle roof panel has a recessed preform in a top portion of the panel. The preform is stamped in the panel at a location to define a perimeter for a sunroof opening. The preform being characterized by having a first bend which defines the opening perimeter comprising rounded corner portions interconnecting a front edge, a rear edge and two side edges, a downwardly extending flange which becomes a sidewall of a sunroof opening, the flange extending inwardly for a length at least equal to a depth of a seal portion of sunroof panel perimeter and a second bend extending opposite to the first bend for interconnecting said flange to a base plate portion of the recess. The flange provides a locator surface on its underside for subsequent stamping, punching and processing stations.

In accordance with another aspect of the invention, in a method for stamping and punching at several stations an opening in a vehicle roof panel for a sunroof installation, the initial operation of stamping a preform recess in a top section of the panel defines a perimeter for a sunroof opening. The initial operation comprises:

i) locating the roof panel in a stamping press beneath a press die, the panel being fixed relative to the die to align die perimeter with a predetermined position for the sunroof opening perimeter in the roof panel;

ii) stamping the preform recess in the roof panel to provide the perimeter for a sunroof opening, the preform being characterized by having a first bend which defines the opening perimeter comprising rounded corner portions interconnecting a front edge, a rear edge and two side edges, a downwardly extending flange which becomes a sidewall of the sunroof opening, the flange extending for a length at least equal to a depth of a seal portion of sunroof panel perimeter and a second bend extending opposite to the first bend for interconnecting the flange to a base plate portion of the recess; and iii) at subsequent stations using an underside surface of the flange to locate the panel for further processing.

In accordance with another aspect of the invention, an apparatus for bending lip portions of depending flange portions defining a trapezoidal shaped opening for a sunroof in a vehicle roof panel, such lip portions extending along front, back and both sides of such opening, such flange portions being supported by back up flanges of an interior reinforcing ring. The apparatus bends such lip portions under such reinforcing ring flanges to provide a lead in to facilitate installation of a sunroof panel system. The apparatus comprises:

i) a back up block mounted on a first carriage;

ii) a stacked stripper block on top of a die block mounted on a second carriage, the stripper block being moveable relative to the die block where the stripper block is supported in a start position by a compressible high pressure yield device;

iii) a variable speed extendible and retractable drive fixed at a first end to the first carriage and fixed at second end to the second carriage;

iv) a controller for controlling direction of movement of the drive;

v) the controller actuating movement of the drive in a first direction to advance the backup block towards and contact such interior flange of such reinforcing ring and upon contact of the backup block, the stripper block advances towards and contacts such depending flange of such roof panel, the controller continuing movement of the drive to clamp such flanges between the backup block and the stripper block and compress the yield device to advance thereby the die onto such lip portion and bend such lip under such reinforcing ring flange and against the backup block;

vi) whereby the backup block and the stripper block float in locating and contacting such flanges of such reinforcement ring and such roof panel on the front, back and both sides of the sunroof opening.

In accordance with a further aspect of the invention, a process is provided for preparing a trapezoidal shaped sunroof opening in a vehicle roof panel to receive a sunroof panel system, the opening having depending flange portion with lip portions at the front, rear and both sides of the opening, the flange portion being supported by back up flanges of an interior reinforcing ring. The process of bending the lip portions under the flange portions of the reinforcing ring to provide a lead-in to facilitate installation of a sunroof panel system i) clamping the flanges of the roof panel and the reinforcing ring between a backup block contacting the interior ring flange and a stripper block contacting the flange of the roof panel;

ii) advancing beneath the stripper block, a die block to bend the respective lip portion beneath the respective flange of the reinforcing ring to provide the lead in portion at the front, rear and sides of the opening.

BRIEF DESCRIPTION OF THE DRAWINGS

Preferred embodiments of the invention are shown in the drawings wherein:

FIG. 1 is a perspective view of a robot transporting a vehicle roof panel;

FIG. 2 is a top view in schematic showing 5 stations with 4 robots for processing a vehicle roof panel to provide a sunroof opening;

FIG. 5 is a section along the lines 5—5 of FIG. 4;

FIG. 6 is a perspective view of the vehicle roof panel showing the cutout in dot to provide the precursor of the sunroof opening;

DETAILED DESCRIPTION OF THE PREFERRED EMBODIMENTS

Figure 3:
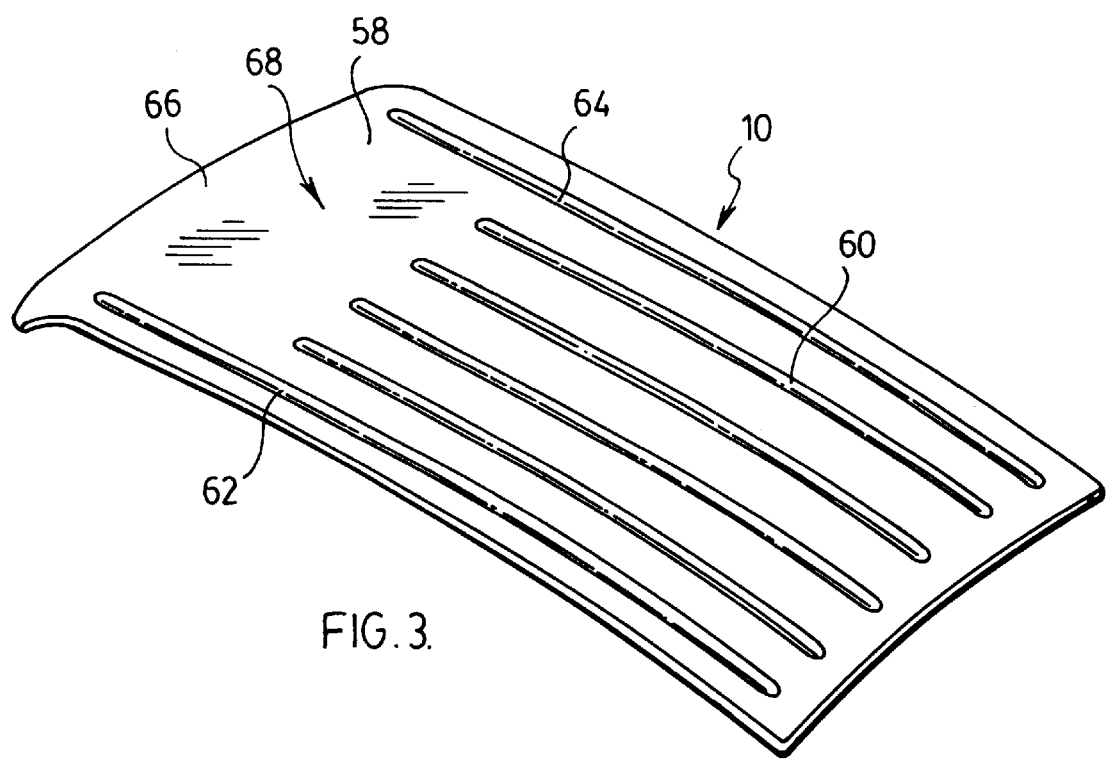
FIG. 3 is a perspective view of a vehicle roof panel.

Robotics provide a reliable, consistent, untiring and precision manipulation of materials. It was therefore most desirable to take advantage of these features of robotics in handling vehicle roof panels for purposes of stamping and punching to form a sunroof opening in the vehicle panel. In accordance with this invention, robotics were adapted to handle vehicle roof panels, particularly for vehicles having extended roof lengths such as vans, large sport utility vehicles and the like. There are at least three primary areas in which robotics have been adapted to permit the processing of the vehicle roof panel. These areas include the stamping of a recessed preform in the panel which provides precision locating of the roof panel during subsequent stamping and punching operations. The second area is the placement of the roof panel with punched out sunroof opening, downwardly onto a sunroof opening reinforcement ring. The third area is in the provision of floating dies which find the perimeter of the punched out sunroof with reinforcement and from the underside set the flanges to provide lead in surfaces for subsequent automated insertion of a sunroof panel system into the vehicle roof of a car frame.

In respect of the robotics adapted to the handle the roof panels, a representative system is shown in FIG. 1. A Vehicle roof panel 10 is picked up by a carrier 12 secured to a robotic arm 14 by standard 16. The carrier 12 has a plurality of suction cups 18 to which a vacuum is applied through the frame members 20. Robotics are virtually insensitive to weights for which they are designed. In this particular application, this is readily achieved because the anticipated weight of the vehicle roof panel 10 is in the range of 40 to 100 pounds (15 kg to 40 kg). The significant benefit in using robotics to pickup and move the roof panel 10 is that the suction cups 18 may be strategically located on the carrier 12 to connect to the panel at locations such that when the panel is lifted and transported, bending and buckling of the panel is eliminated. This is a common problem when the panels are handled by operators because operators can only lift the panels from the corners and the edges which can result in panel bucking and hence, scrap. Operator handling of the panels is therefore to be minimized in accordance with this invention because the panels usually have a Class I surface so that scrapping of the panel results in a significant increase in manufacturing cost. The robot 22 has the usual base 24 which can swing 360°. The usual hydraulics and linkages 26 are provided which allow movement of the arm 14 in the vertical plane. Transmission 28 provides for rotation of the arm 14 so that the panel can be moved to any desired orientation form the horizontal plane, as shown in FIG. 1 through to a vertical orientation. As well, the standard 16 may also swivel about 360° so that the panel can be moved about the axis, hence, providing panel movement in the X, Y and Z axis.

With reference to FIG. 2, a multistation robotic stamping and punching system 30 is schematically shown. Roof panels 10 are delivered to transfer station 32 by suitable material handling devices which may be robotics. If the panels are suspended to hang in a suitable inventory crib, the material handling device is capable of removing each panel individually from the bin and manipulate it form its vertical orientation of a horizontal resting orientation with appropriate supports at station 32. Suitable inspection devices and/or illumination systems may be provided at station 32 so as to allow the operator to identify any imperfections in the surface of the vehicle roof panel 10. If there are any imperfections such as buckled, dented or warped portions, paint scratches and the like, the panel is rejected before it is forwarded into the processing stations of system 30. Station 32 has sensors to indicate that a vehicle roof panel is in position. Robot 22 is programmed to transfer the panel to station 34 where a preform is stamped into the panel, which is described in more detail. With respect to FIGS. 3 and 4. The robot 22 is programmed to place the panel in the stamping station 34 and by suitable guides, the panel is located in the press so that the preform is tamped into the panel within the desired dimensional tolerances for the locating of the sunroof opening in the vehicle roof panel. After stamping of the preform, robot 22 removes the panel 10 for transfer station 36. A further robot 38 is programmed when a panel is sensed at station 36 to transfer the panel to station 40 where a cutout is punched in the preform, the shape of that cutout being described in more detail with respect to FIG. 6. After the cutout is punched form the preform, the panel 10 is transferred by robot 38 to transfer station 41. Robot 42 transfers the punched roof panel from transfer station 41 to stamping station 44 where the flange portions of the cutout are bent to define the perimeter of the sunroof opening which is described in more detail with respect to FIG. 7. At this station the flanges all extend downwardly and define within the desired tolerances the precise location of the flanges to receive the sunroof panel system.

At station 46 the reinforcing ring and panel 10 are married up and welded before the flanges are set at station 48 to define the necessary lead in portions to facilitate automated installation of the sunroof panel system into the roof panel. In preparation for marrying the reinforcing ring to the roof panel 10, robot 50 transfers a reinforcing ring 52 from stacked supply 54. The robot transfers the reinforcing ring 52 past an epoxy resin applicator 56 for applying a bead of epoxy to the rear edge of the reinforcing ring 52, which will be described in more detail with respect to FIGS. 7, 8 and 10B. The reinforcing ring 52 with the epoxy bead along the back edge is positioned in station 46 before panel 10 is lowered onto the reinforcing ring. The flanges as stamped at station 44 are located within desired tolerances so as to nestle within the interior perimeter of the reinforcing ring and hence, marry the two items. At station 46 a welding system is provided beneath the panel to weld the reinforcing ring along at least the two sides and the front edge and if there is sufficient flange, along the rear edge. Although in accordance with this particular embodiment, the rear edge of the sunroof opening in the vehicle panel is too shallow to provide for welding and hence, the use of the epoxy adhesive. The shallowness of the rear edge is dictated by the fact that the sunroof panel assembly needs to drop down slightly and then retract rearwardly to provide a complete opening in the sunroof.

After the reinforcing ring is welded to the vehicle roof panel, the assembled component is transferred to station 48 where the flange portions with lips projecting beneath the reinforcing ring are set at an angle so as to provide a lead in surface to facilitate automated insertion and connection of the sunroof panel system to underside of the roof panel secured to a vehicle frame. It is understood of course that the lead in portions also facilitate manual installation but the primary purpose of the flange setting is to achieve automated installation of sunroof panel systems. Further details of the flange setting are discussed with respect to FIGS. 11, 13 and onwards. After the flange setting, the panel 10 is removed from station 48, preferably by a suitable material handling system and stored in an inventory bin for shipping.

The robotic system for handling the vehicle roof panel 10 through the series of processing stations ensures that the roof panel 10 is not buckled, bent or marred. The robotics are precisely programmed to ensure that the roof panel does not collide with other roof panels in the processing stations. The suction cups 18 always pick up the roof panel in the appropriate areas to ensure that the panel does not buckle. This is a significant advantage over manually handled panels because of the potential of bending of the panel and overstressing the material and resulting in unwanted buckles. It is understood that manual handling of the panels usually results in turning the panel upside down to avoid bending. This greatly complicates the stamping and punching of the material as well as the assembly of the reinforcing ring to the sunroof opening. By way of the robotic system, the panel is always into and out of the station in the upright orientation and then supported by appropriate jigs at each station to ensure that the stamping and/or punching operation at each station is precisely within the desired tolerances at each station. The robotic system ensures that the each completed panel with reinforced sunroof opening has the opening positioned within desired tolerances within the roof panel and as well, the flanges in defining the opening for the sunroof panel are more precisely defined to ensure that a proper seal is always formed between the sunroof panel and the flange which defines the sunroof opening. The feature of this invention which greatly facilitates robotics in handling the vehicle roof panel is the formation of a recessed preform in the top portion of the panel. The preform is stamped in the panel at a location to define a perimeter for the sunroof opening, as will be described in more detail in FIGS. 3 and 4. It is appreciated that the robotics of the punching and stamping system 30 are preferred, particularly when handling larger roof panels. It is understood that for shorter vehicle roof panels such as for cars, particularly small to mid-size cars, the panels may be maneuvered manually, although use of the robotics is still preferred. Generally, panels of this type are considerably lighter, usually in the range of 30 to 40 pounds.

With reference to FIG. 3, a vehicle roof panel 10 is shown where on the upper surface 58 a plurality of longitudinally extending reinforcing ribs 60 are provided. Two of the ribs 62 and 64 extend into the forward portion 66 of the roof panel. The balance of the ribs 60 are shorter, hence, leaving an area generally designated 68 in which a sunroof opening may be formed. This setup for the reinforcing ribs is reasonably standard for larger sizes vehicle roofs, particularly roof panels for vans, utility trucks, utility vans and utility vehicles.

Figure 4:
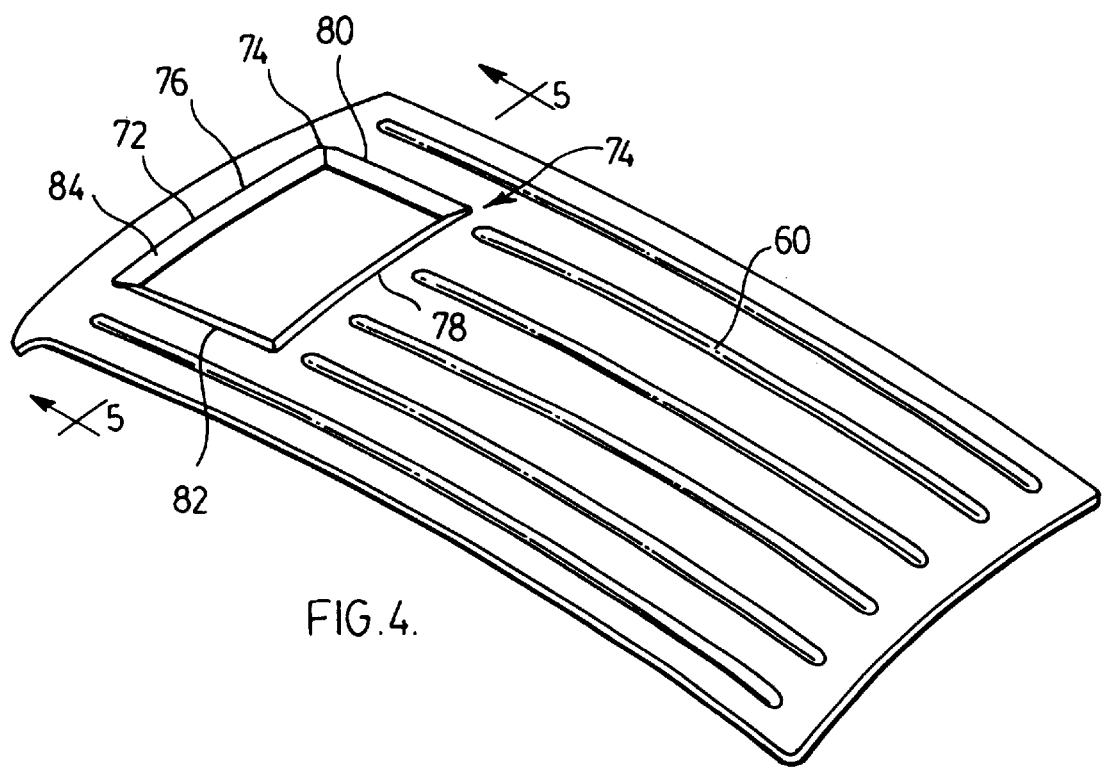
FIG. 4 is a perspective view of vehicle roof panel with a preform recess formed therein.

In view of the relatively large expanse of relatively thin metal in region 68, it is difficult to maintain perfection in the surface during the various stamping and punching operations in system 30. It has been found quite surprisingly that by stamping into region 68, a recessed preform, subsequent handling and processing of the roof panel does not induce buckling, bending or other surface imperfections in the roof panel, particularly in region 68 and particularly about the perimeter of the opening to be formed in the vehicle roof. Furthermore, the stamping of the preform in the roof panel stresses somewhat the material about the opening to be formed in the vehicle roof to minimize buckling of the panel, particularly in regions about the opening perimeter. As shown in FIG. 4, the recessed preform 70 is stamped in region 68 of the roof panel. Such stamping of the preform, as previously described, occurs at station 34. The preform has a first bend 72 which is also shown in more detail in FIG. 5, which is a section along 5—5. This first bend defines the opening perimeter for the sunroof opening and comprises rounded corner portions 74 interconnecting a front edge 76, a rear edge 78 and two side edges 80 and 82. A downwardly extending flange 84 extends about the perimeter of the recessed preform. The flange 84 extends inwardly for a length at least equal to a depth of a seated portion of a sunroof panel perimeter which is ultimately formed at station 44. A second bend 86 extends opposite to bend 72 and interconnects the flange 84 to a base plate portion 88. Not only does the formation of the preform in region 68 of the vehicle panel pre-stress the panel to strengthen the region around the perimeter 72, but as well the underside 90 of the flange 84 can be keyed in the subsequent stations as a locator surface to precisely position the panel for stamping, punching, and further processing. Clearly, the backup blocks at processing stations 40 and 44 are provided with mating sloped surfaces to correspond with sloped surface 90 and thereby precisely locate the roof panel for the next stamping, and/or punching operation.

As shown in FIG. 6, the enlarged view of the preform shows in dot the perimeter 92 of the cutout to be formed in the base 88. The preform has the rounded corner portions 74 with the inwardly extending flange 84, as defined by the perimeter ridges 76, 78, 80 and 82. The cutout 92 has rounded lobe portions 94 which extend into each round of corner 74 and intersect the second bend 86 at each rounded corner region. The cutout has a front edge 96 and a rear edge 98 with side edges 100 and 102. The location of edges 96, 98, 100 and 102 define lip portions 104, 106, 108 and 110, respectively, which extend downwardly from the flange portions 84, beyond the second bend 86. It should also be noted that the lobe portions 94 of the cutout along the rear part of the opening have inwardly extending relief cuts 112 and 114 which facilitate downward bending of the flange 84 along the rear edge 78. Such bending takes place at station 44 in a manner to be described with respect to FIG. 7. Such relief cuts 112 and 114 prevent buckling of the flange in these regions is completely smooth and is capable of forming a good seal with the seal portion of the sunroof panel.

Figure 7:
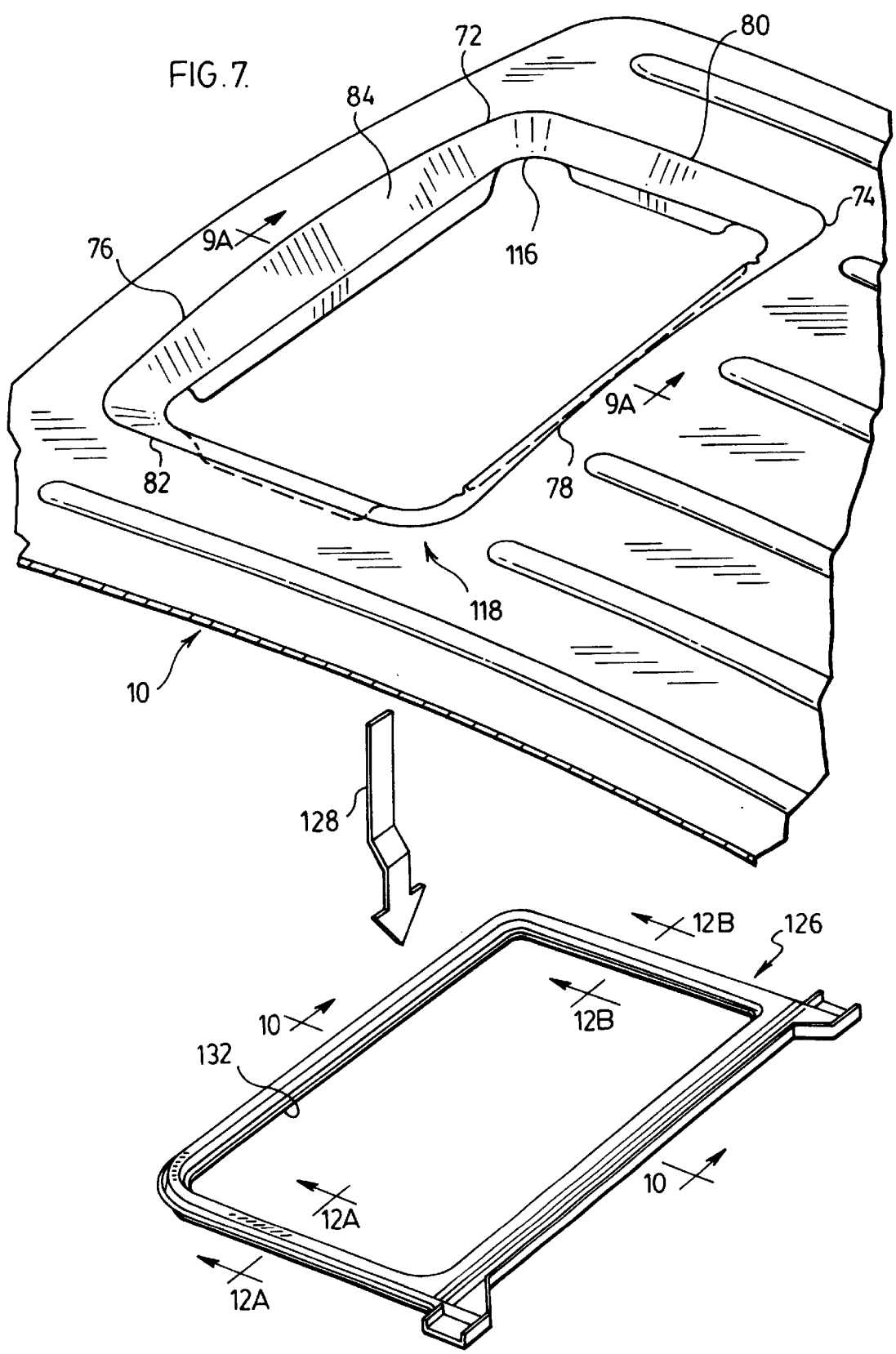
FIG. 7 is an exploded perspective view of the vehicle sunroof opening having flanges bent downwardly in preparation for insertion in a sunroof opening reinforcing ring.

Referring to FIG. 7, the cutout at station 40 has been completed where the panel is then moved to station 44 for purposes of flange and interconnected lip bending. The flange 84 is bent downwardly along the entire perimeter of the sunroof opening as defined by the first bend 72. By virtue of the preform the exact edges 76, 78, 80 and 82 are maintained during a subsequent bending step to ensure accuracy of the opening dimension. Furthermore, by virtue of the shape of the cutout having the rounded arcuate portions 116 as a result of the cutout portions 94, the flange can be bent downwardly without disrupting the panel material around the perimeter of the sunroof opening. Applicant has found that by virtue of the recessed preform, material about the corner portions 74, such as the region generally designated 118, does not pucker or buckle and hence, the opening is formed in the sunroof panel without the development of the commonly referred to "mouse cars".

Figure 9A:
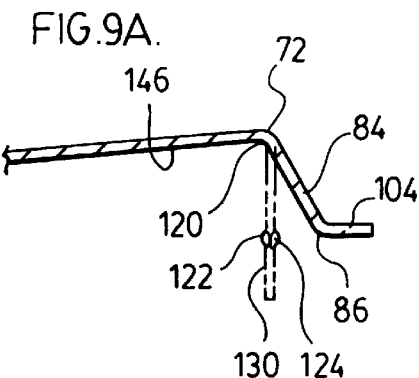
FIGS. 9A and 9B are sections through the front and back edges of the sunroof opening before the flanges are bent downwardly.
Figure 9B:
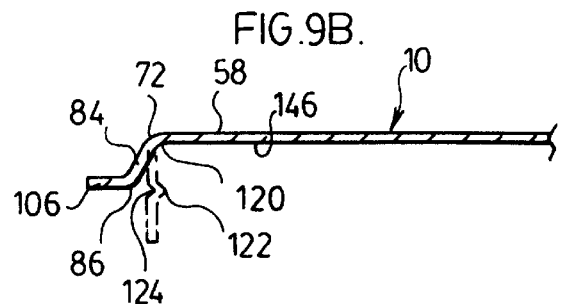

As shown in FIGS. 9A and 9B, at station 44, the flange 84 is bent downwardly about the first bend 72. The stamping station 44 locates on the underside 120 of the bend 72 to precisely locate the panel 10 at the station so that the flange and corresponding lip portions 104 and 106 are bent at approximately 900 relative to the top surface 58 of the panel 10. Due to the second bent 86 when the flange 84 and corresponding lip 104, 1067 108 and 110 is bent to the vertical orientation, a slight bump 122 is formed which provides on the exterior surface a very slight recess 124. This is due to the preworking of the metal in forming the preform but does not in any way interfere with the seal formed with the roof panel because as previously noted, the depth of the flange 84 exceeds the depth of the roof panel edge seal. Although in FIGS. 9A and 9B, the rear flange portion 84 is shown as being slightly shorter than the front flange portion 84, it is understood that the flange 84 may be of consistent depth around the entire perimeter of the opening. With the flange and corresponding lip portion bent downwardly, the roof panel is ready to be assembled onto the reinforcing ring generally designated 126 in FIG. 7. By virtue of the precise location of the flange and lip portions and the use of robotics, the roof panel 10 may be settled downwardly onto the reinforcing ring 126 to thereby minimize the potential of any buckling of the roof panel in marrying up lowering the roof panel in the direction of arrow 128. It is understood that the tolerances between the interior surfaces of the lip 130 and the interior surface 132 of the ring is such that a friction fit between the two is achieved to facilitate welding of the interior lip 132 of the reinforcement ring 126 with the flange portions 84 of the roof panel.

Figure 8:
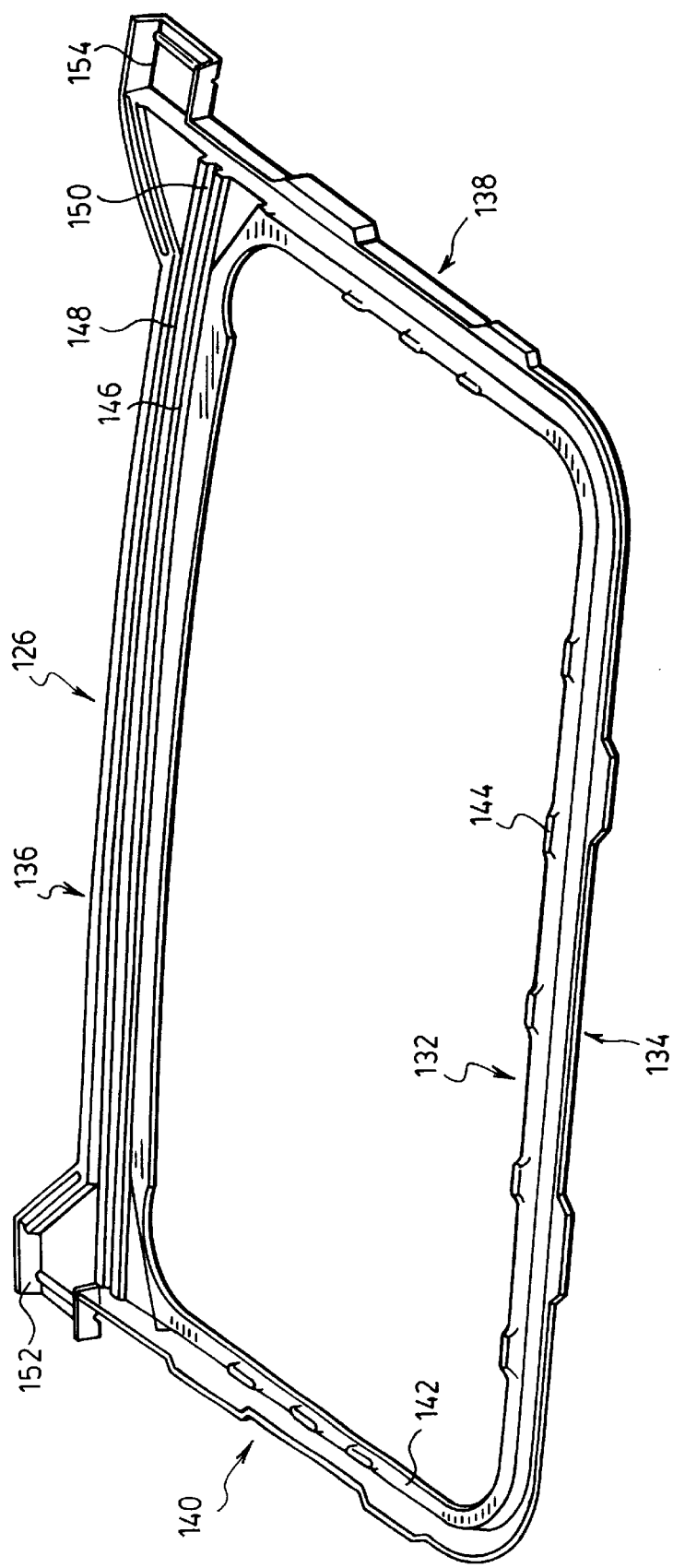
FIG. 8 is a perspective view of the reinforcing ring for the sunroof opening.

The reinforcement ring 126 is shown in more detail in FIG. 8 and has a front portion 134, rear portion 136 and side portions 138 and 140. The ring has an interior perimeter 132 defined by a depending flange 142. Flange 142 is dimensioned within the manufacturing tolerances to receive the interior surface of the depending flange and lip 130 of the roof panel where preferably there is a slight frictional engagement of the surfaces so that they are contacting and thereby facilitate welding. The side portions 138 and 140 and front portion 134 includes raised elements 144 which are designed to engage the underside 120 of the bend 72 and correspondingly the underside 146 of the roof panel top portion 58. The interfit is shown in more detail in FIGS. 11A and 11B. The raised portions 144 ensure a proper seating of the reinforcement ring beneath the roof panel and facilitate the sliding fit of the roof panel flanges within the perimeter flange 142 of the reinforcement panel. The rear portion 136 includes raised channels 146 and 148 which define thereby a groove 150. The groove 150 extends the length dimension of the rear portion 136 and this groove portion is filled with the epoxy resin for securing the underside 146 of the roof panel with the rear portion 136 of the reinforcement ring. The reinforcement ring also includes U-shaped members 152 and 154 which are interconnected with the post portions of the vehicle to complete the structural reinforcement of the roof panel area.

Figure 10A:
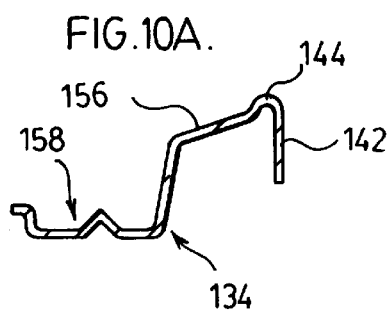
FIGS. 10A and 10B are sections through the front and back edges of the reinforcing ring.
Figure 10B:
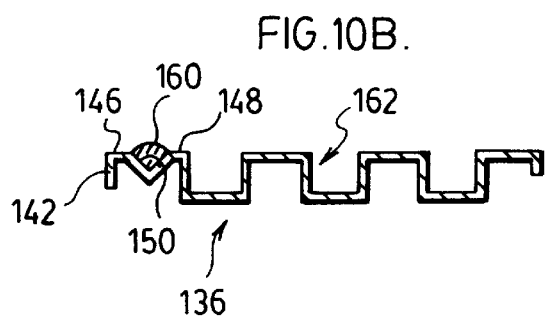

Turning to FIG. 10 which is a section through the front portion 134 and rear portion 136, the reinforcement ring has the depending flange 142 defining the front and rear portions of the perimeter 132. The section is through the raised portion 144 which is interconnected to an angled ledge 156 which leads into the base part 158 of the reinforcement ring. Correspondingly in the rear portion the parallel channels 146 and 148 are shown with the groove 150 which in this embodiment happens to be a V-shaped groove. As previously mentioned at applicator 56, a bead of epoxy resin 160 is injected before the reinforcement ring is positioned at station 46. Rearwardly of the reinforcement ring is a corrugated portion 162 which transfers any forces from the vehicle post through the connectors 152 and 154.

Figure 11A:
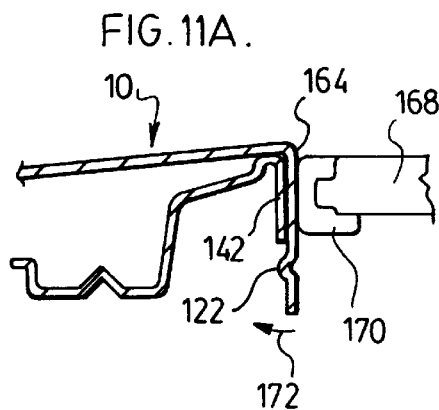
FIGS. 11A and 11B are sections through the front and back portions of the vehicle roof panel and reinforcing ring assembled therebeneath.
Figure 11B:
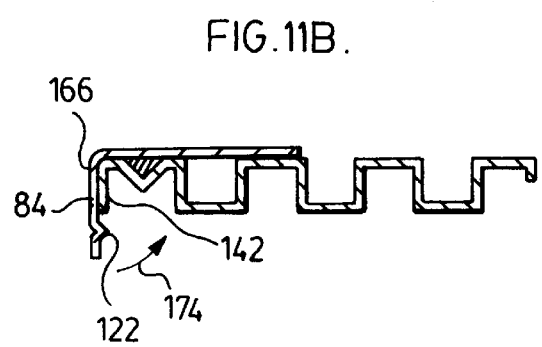
Figure 12A:
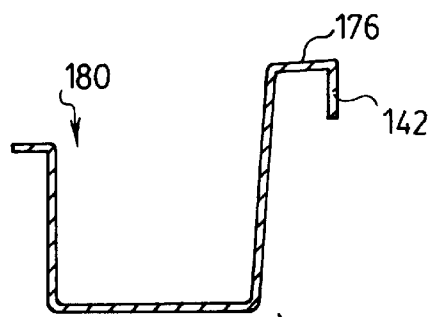
FIGS. 12A and 12B are sections through the side portions of the reinforcing ring of FIG. 7.
Figure 12B:
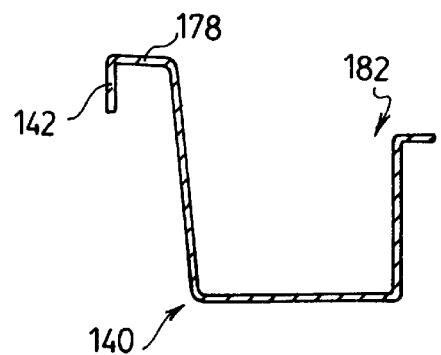

As shown in FIGS. 11A and 11B the roof panel 10 is lowered onto the reinforcement ring. The raised portions 122 snugly receive the exterior of the flange 142 to in essence provide a snap fitting of the flange 142 within the flange 84 of the roof panel. Such an arrangement ensures that the dimensioning between surfaces 164 and 166 remains within tolerance and provides a surface which is essentially vertical and is of a depth which is greater than the seal with a sunroof panel. For representation purposes in FIG. 11A, part of the glass 168 of the sunroof panel is shown with integral seal 170 where it can be seen that the height of the flange 84 is greater than the height of the seal 170 to thereby ensure within manufacturing tolerances a reliable long lasting seal against the precisely dimensioned surfaces 164 and 166 of the sunroof opening perimeter. As will be described in more detail with respect to the flange setter of FIG. 13, the lip portions 104, 106, 108 and 110 are bent to the extent required, as shown by arrows 172 and 174, to provide the desired lead in portions to facilitate insertion of the sunroof panel in the opening in the vehicle roof. For the sake of completeness, FIGS. 12A and 12B are sections as indicated on FIG. 7 of the reinforcement ring. Such sections are through portions 138 and 140 where the flange 142 has an upper ledge 176 and 178 that leads into a boxed reinforced structure 180 and 182.

Figure 13:
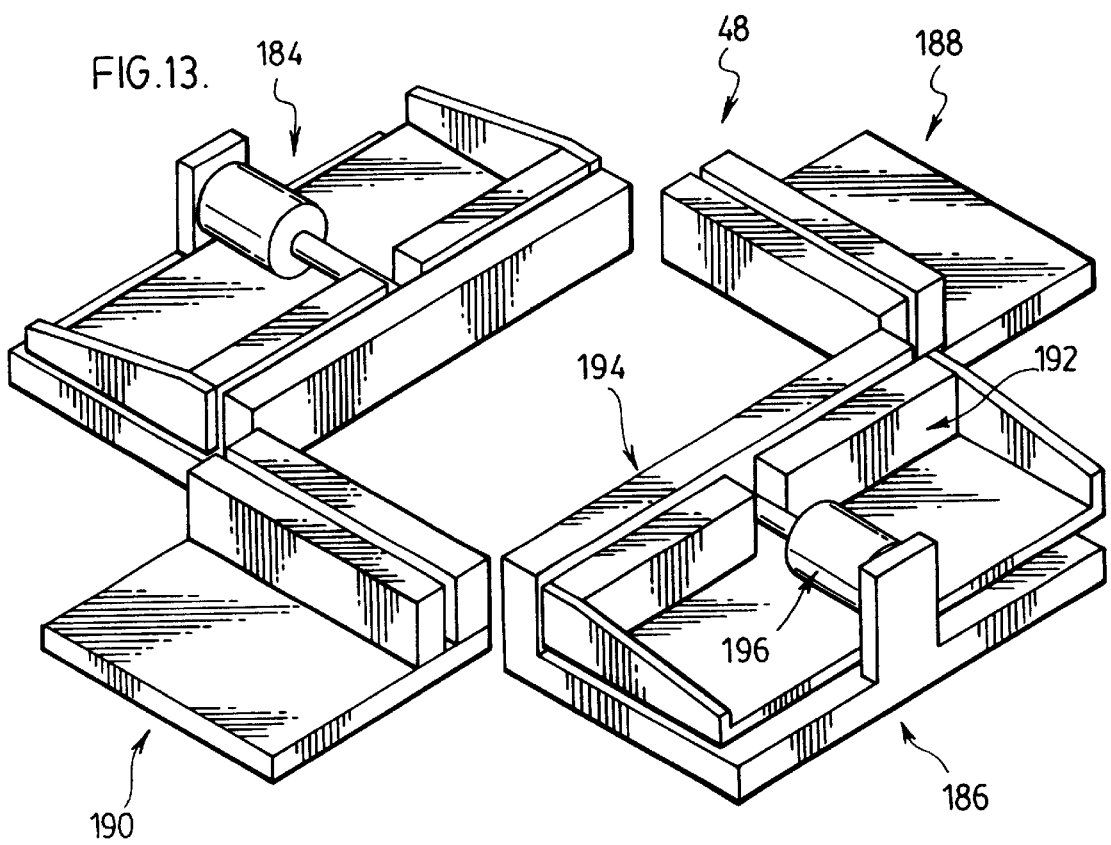
FIG. 13 is a perspective view in schematic of the flange setter apparatus for bending the flanges of the sunroof opening.

In order to complete the assembly of the roof panel to the reinforcement ring and to facilitate insertion of the sunroof panel in the opening, a flange setter is provided at station 48, as shown in FIG. 13. The flange setter is designed to bend the flange and any depending lip portion inwardly of the roof panel relative to the opening of the sunroof where such bending occurs at the front and rear and side portions for the flange 84 in respect of depending lips 104, 106, 108 and 102. The flange setter 48 has four separate floating block units, 184 for the front portion, 186 for the rear portion and 188 and 190 for the side portions. Schematically shown, each unit has a backup block system 192 which engages beneath and behind the flange 142 of the reinforcement ring and a combination stripper block and die block 194 which clamps the flanges 84 and 142 between the stripper block and the backup and also serves by way of the die block to bend the flange inwardly relative to the roof panel. The backup block system 192 is moveable relative to the stripper block and die block 194. Their relative movement is determined by a driver 196. In addition, the stripper block die block system 194 is also moveable inwardly and outwardly relative to the opposing block system, for example, 184.

Figure 14:
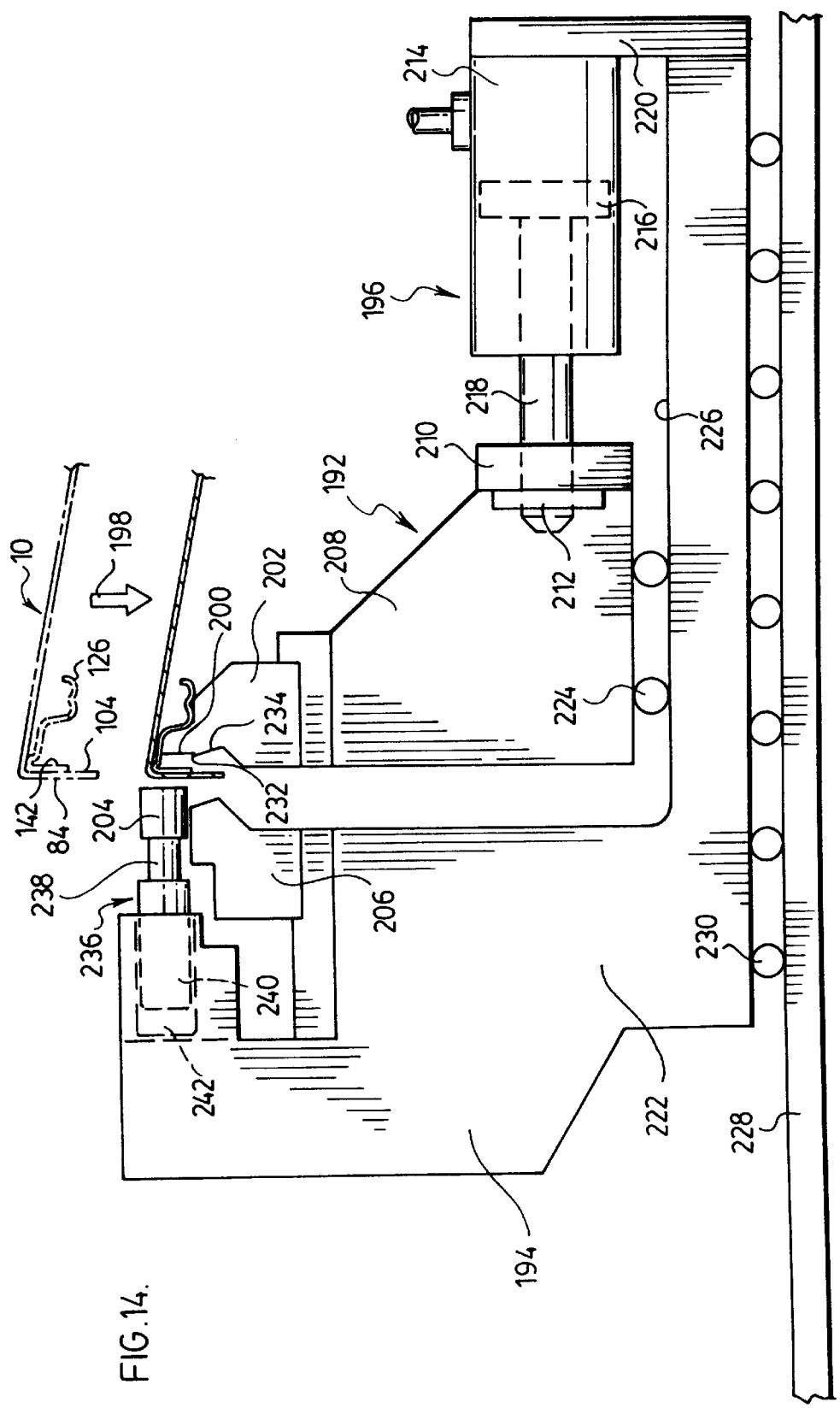
FIG. 14 is a section through one of the flange setters having the front edge of the roof panel and reinforcing ring inserted therein.

FIG. 14 is a section through the flange setter unit 184 showing the front edge of the roof panel 10 with depending flange 84 and corresponding lip 104 welded to the flange 142 of the reinforcing ring 126. The system is lowered in the direction of arrow 198 and positioned between the clamp surface 200 of the backup block 202 of the backup block system 192. On the opposite side is the combination stripper block 204 and die block 206 which are mounted on the separate stripper die block system 194. The backup block system 192 has a structural carriage frame 208 which supports and is connected to the die block 202. The frame 208 has secured at its base 210, one end 212 of the drive 196, which in accordance with this preferred embodiment, is a hydraulically driven cylinder 214 with piston 216 and piston rod 218. The cylinder 214 is secured by plate 220 to the carriage frame 222 of the stripper and die block system 194. As previously noted, the flange setter mechanism is free floating so as to adjust to the positioning of the flanges 84 and 142 between the work surfaces and engage those work surfaces without marring, bending or buckling the precisely located flanges. This free floating system is achieved by virtue of two separate carriages. The carriage of system 192 comprises the frame 208 mounted on a slide mechanism represented in this embodiment by rollers 224. This carriage 208 with rollers 224 in turn is mounted on a support surface 226 of frame 222. Frame 222 correspondingly is mounted on a base 228 by a slide, which in accordance with this embodiment, are a plurality of rollers 230. The base 228 is fixed, hence, the carriages 222 and 208 are free to move relative to each other within the limits of the stroke of the drive 196. As is appreciated, stops may be provided on the base 228 to limit travel of the carriage 222 and correspondingly, stops maybe provided on surface 226 to limit travel of the carriage 208.

The backup block 202 has a planar face for engaging flange 142 with an indent 232 to accommodate thickness of the flange 142. Beneath indent 232 is sloped faced 234 which defines the angle at which the depending flange 84 and lip portion 104 is bent inwardly relative to the roof panel 10. The stripper block 204 is mounted on a yield device, which in accordance with this particular embodiment is a gas spring 236 which has a rod 238 mounted to a plunger 240 which is in a confined gas filled space 242. The gas spring is designed to have a reasonably high yield point before it commences movement inwardly relative to the die block 206 which is fixed to the frame 194. This high yield point ensures that the flanges are firmly clamped before the die block advances and bends the depending flange inwardly relative to the panel 10.

Figure 18:
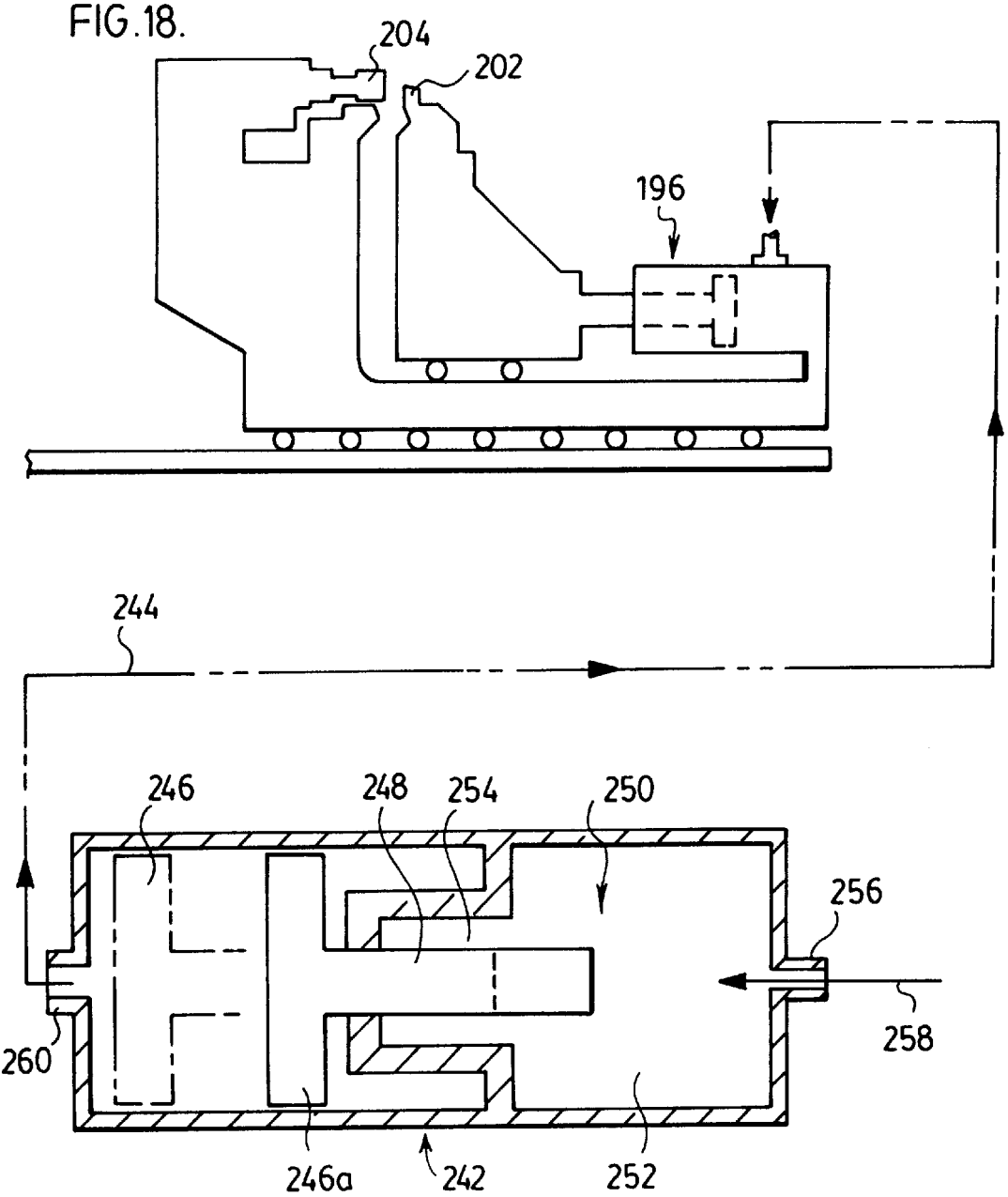
FIG. 18 is a schematic of the oil/air hydraulics systems for driving the flange setter.

With reference to FIG. 18, a controller for the drive 196 is provided so as to encourage a rapid but low pressure rapid movement between the backup block 202 and the stripper block 204. To achieve in the first instance rapid movement at low pressure, a controller mechanism 242 is provided which supplies hydraulic fluid in line 244 to the drive 196. The controller mechanism 242 has a piston 246 with a piston rod 248 extending into an air cylinder 250. The air cylinder 250 is of two sequentially decreasing shaped chambers 252 and 254. Air pressure is supplied to the cylinder 250 through line 256 in the direction of arrow 258. With the piston 246 in the start position 246a, the piston rod 248 is in the position shown. As pressurized air is introduced to the larger chamber 252 there is a high volume of low pressure fluid forcing the piston rod 248 towards the position 246. Because of the large volume of air at low pressure, the piston 246 moves rapidly towards the outlet for the hydraulic fluid at 260 forcing at low pressure but high volumes, hydraulic fluid through line 244 to drive 196. This rapid advance under low pressure causes the backup block to contact the flange 142 and then continues the movement under little resistance of the respective carriages so that the stripper block contacts flange 84. This procedure is discussed in more detail with respect to FIGS. 15 and 16. As the piston rod 248 enters chamber 254 the reduced cavity 254 significantly increases the pressure on the piston rod and hence, significantly greater force is exerted on the piston 246 which results in a significantly higher pressure of hydraulic fluid in line 244 advancing the drive 196. Such pressure of hydraulic fluid is sufficient to overcome the yield point of the gas spring 236 of FIG. 14. In this manner a two-stage drive is provided having an initial high speed low pressure stroke and a secondary low speed high pressure stroke to complete the flange setting operation.

Figure 15:
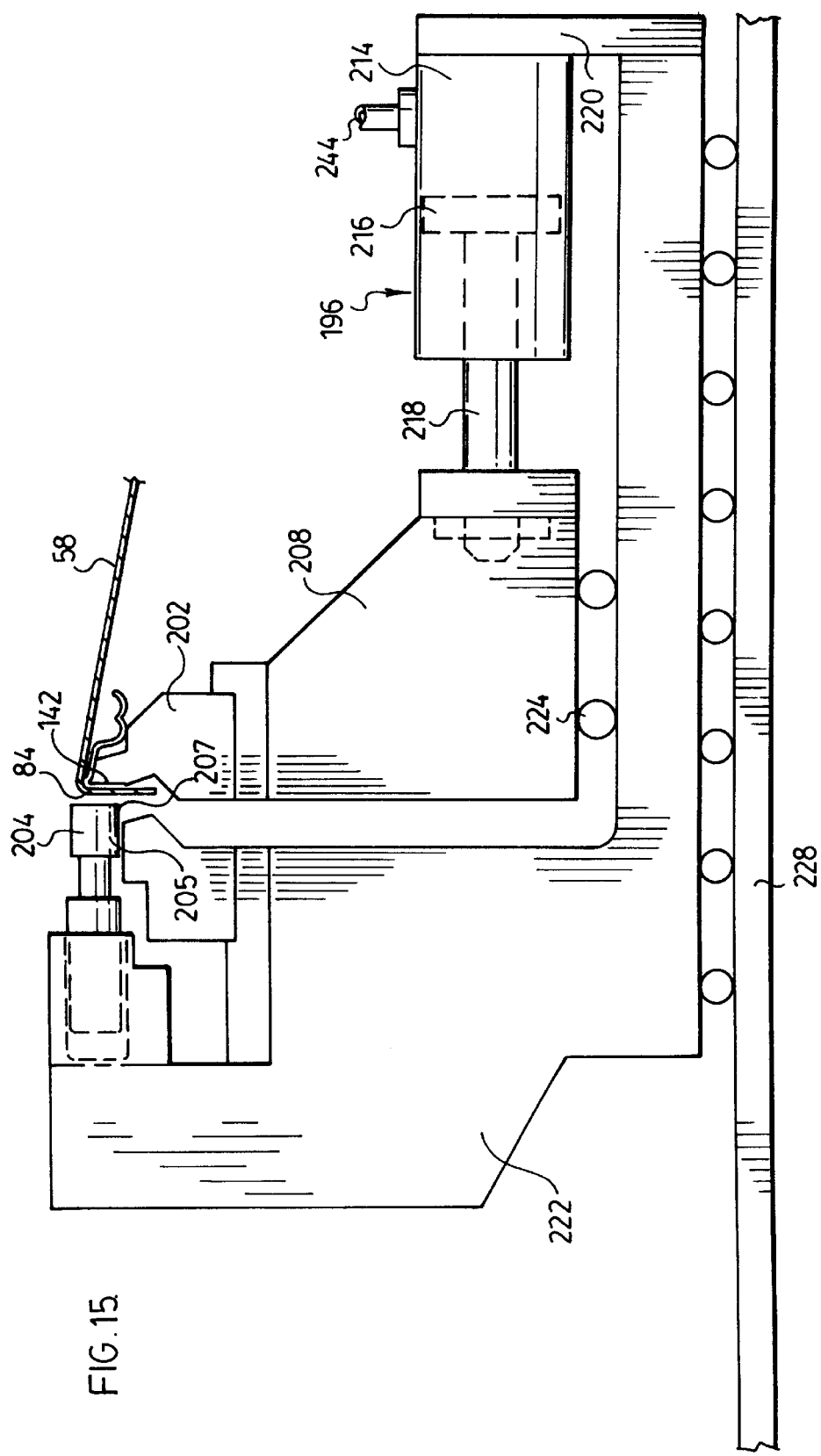
FIG. 15 shows movement of the backup block to meet the interior surface of the reinforcing ring.
Figure 16:
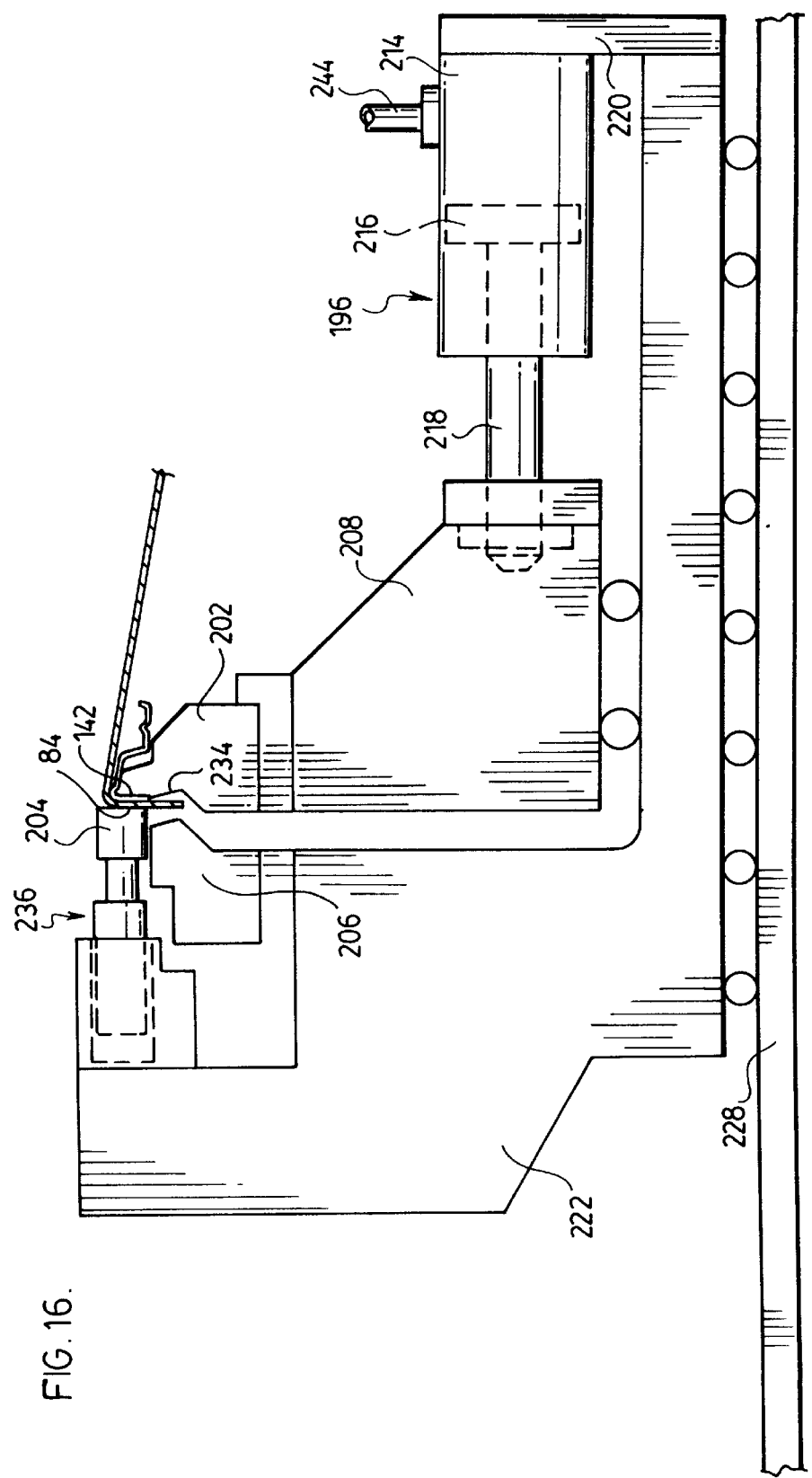
FIG. 16 shows movement of the stripper block to sandwich the front edge of the roof panel and reinforcement ring between the stripper block and the backup die.
Figure 17:
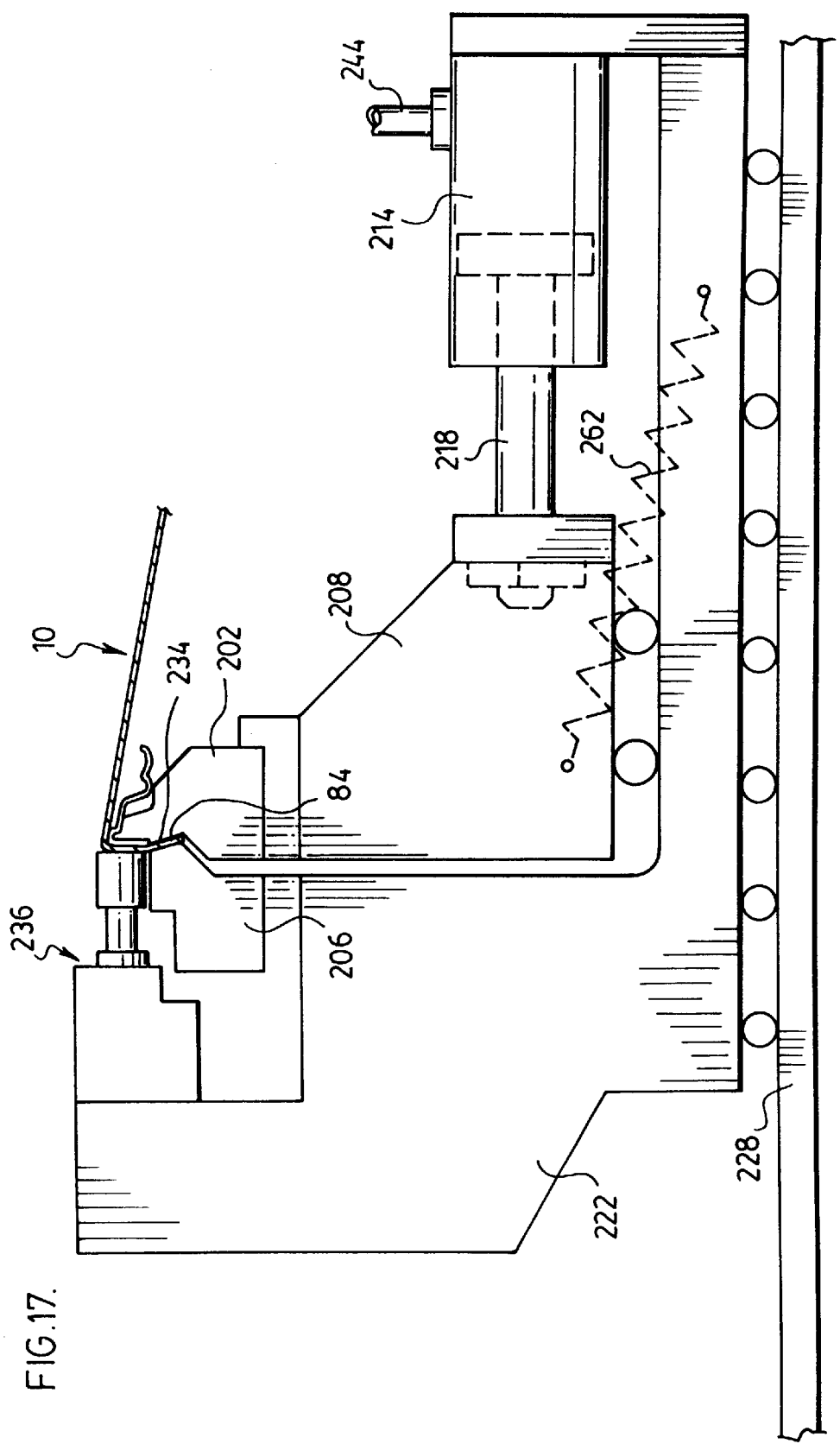
FIG. 17 shows movement of the die block to bend the flange which is clamped between the backup block and the stripper block.

The sequence of events is now described in more detail with respect to FIGS. 15, 16 and 17. In FIG. 15 the drive 196 with low pressure high volume hydraulic fluid entering via line 244 advances the piston 216 so as to extend the piston rod 218 and move the carriage frame 208 in a direction towards the larger and heavier carrier frame 222. Since both units are able to move relative to the base 228 it is virtually the lighter element which moves first, which is the carriage frame 208 for the backup block 202. As the low pressure high volume hydraulic fluid enters the cylinder 214, the piston advances and due to the lighter weight of the carriage 208 it moves along rollers 224 towards the frame 222 and the frame 222 does not move, or moves very little in the first instance relative to the base 228. Once the stripper block 202 contacts the flange 142 further advancement of the carriage 208 stops because of such contact. Again, due to the low pressure high volume of fluid, the resistance, albeit slight, offered by the backup block contacting the flange 142 then causes the carriage 222 to move relative to the base 228 so that as the piston rod 218 continues to extend by virtue of the drive 196 being connected by plate 220 to the frame 222, the stripper block 204 commences to advance towards flange 84 of the vehicle tip panel. Again the drive 196 is being driven by low pressure high volume fluid in line 244 so that the stripper block 204 continues to advance until it encounters and commences to clamp the flanges 142 and 84 between the backup block 202 and the stripper block. The controller mechanism 242 is set up such that relative movement of the backup block and stripper block at the low pressure high speed is completed before the piston rod 248 commences to enter the more restricted chamber 254. As previously discussed, as the piston rod 248 moves into the restrictive chamber 254 the pressure of the hydraulic fluid delivered in line 244 goes through a transition to high pressure fluid at low volume. This causes the piston 216 to exert considerable force through the piston rod 218 where the stripper block and backup block now firmly clamp the flanges 84 and 142. However, the flange setting die 206 needs to advance in order to bend the flange and lip portion 104 towards the sloped work surface 234 of the backup block 202. In order for this to happen the higher pressure hydraulic fluid now supplied to the drive 196 causes the gas spring 236 to recede and hence, permit relative movement of the die block 206 relative to the stripper block 204. With this higher pressure in the cylinder 214 the piston rod 218 continues to advance and relative movement continues to occur between carriages 208 and 222 because the gas spring 236 is receding, as shown in FIG. 17. The gas spring recedes at least until the die block 206 has bent the depending lip 104 and flange 84 against the work surface 234 and achieve the necessary angle to provide a lead in portion for the sunroof panel. The high pressure is maintained in line 244 until the bending of the flange and setting of the flange position is complete. The pressure is then released in line 244. A resilient device is provided to retract the piston rod 218 into the cylinder 214. In accordance with this preferred embodiment, the resilient device is a spring 262 which takes effect after the gas spring 236 has resumed its normal position, as shown in FIG. 16. The return spring 262 then continues movement of the carriage frame 208 relative to the carriage frame 222 until the die block 202 and the stripper block 236 have moved away from the completed set flange. Once they have moved away from the flange sufficiently the roof panel 10 may be moved upwardly from the flange setting device for storage.

Figure 19:
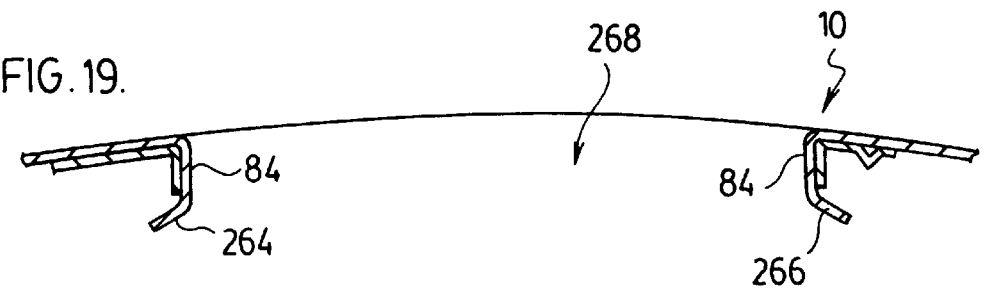
FIG. 19 is a section through the assembled roof panel and ring reinforcement with lead in portions set in the flanges.

As is apparent from this description, the flange setter is free floating, gently seeks the positioning of the flanges on the front, back and side edges, effects a secure clamping and then provides for a bending of the flange inwardly relative to the roof panel. It is the setting of the flange at an angle which facilitates sunroof installation. As can be appreciated, if the flanges were to extend vertically downwardly as shown in FIG. 11a, installation of the sunroof is difficult although not impossible in present day manufacturing facilities. This is usually the arrangement so that the installer needs to angle the panel and slowly cant it back and forth until it is in position. With applicant's system, which is capable of bending the depending flange beneath the reinforcement ring to provide a lead in portion and hence, guide the movement of the sunroof panel into the opening, the system can now be automated or in turn greatly facilitates installation by operators. In either event, a more secure seal of the sunroof panel in the opening is assured because the seal portion as representatively shown that 170 in FIG. 11a is not bent or torn during the installation of the assembly. Reference is made to FIG. 19 where the roof of the panel 110 has lead in portions 264 for the front and a sharper turned in flange portion 266 at the rear. Correspondingly, the side flanges may be bent at an angle roughly resembling that of front flange 264. As the sunroof panel assembly is inserted into the opening, generally designated 268, the seal 170 engages the slope lead in portions 264 and 266 where the slope portions guide the movement of the seal gently into the opening 268 where a firm seal is made with the flange perimeter 84. In the past no one was able to set the flange beneath the reinforcement ring, hence, this system is most valuable in providing for the automation by robotics to insert the sunroof panel within the opening 268.

As noted in FIG. 5, the roof panel upper surface 58 is curved, hence, as can be appreciated by those skilled in the art, correspondingly the backup block 202, stripper block 204 and die block 206 are curved to match the curvature of the flange portion. The lead in portion 264 of FIG. 19 is about 25 to 30 degrees and the lead in portion at the rear for clamping in place the reinforcement ring may be up to 80° from vertical.

To facilitate bending of the flange 84, it is desirable to provide a radius at the bottom portion 205 of the stripper block 204. The radius is shown at 207. This accommodates the bending of the flange against the sloped workface 234.

The system in accordance with this invention, provides a very reliable methodology for forming an opening in the vehicle top panel with a precisely defined flange to form an exacting seal with the panel. The system accommodates the complex shape for a typical sunroof opening namely roof curvatures across the roof panel and along the roof panel. The opening, although it appears to be generally rectangular, it is actually trapezoidal shaped by increasing in width from front to back of the opening. This trapezoidal shape accommodates the sliding out and in of the sunroof panel from under and behind the opening.

Although preferred embodiments of the invention have been described herein in detail, it will be understood by those skilled in the art that variations may be made thereto without departing from the spirit of the invention or the scope of the appended claims.

What is claimed is:

1. In a method for stamping and punching at several stations an opening in a vehicle roof panel for a sunroof installation, the initial operation of stamping a preform recess in a top section of said panel to define a perimeter for a sunroof opening, said initial operation comprising:

i) locating said roof panel in a stamping press beneath a press die, said panel being fixed relative to said die to align die perimeter with a predetermined position for said sunroof opening perimeter in said roof panel;

ii) stamping said preform recess in said roof panel to provide said perimeter for a sunroof opening, said preform being characterized by having a first bend which defines said opening perimeter comprising rounded corner portions interconnecting a front edge, a rear edge and two side edges, a downwardly extending flange which becomes a sidewall of said sunroof opening, said flange extending for a length at least equal to a depth of a seal portion of sunroof panel perimeter and a second bend extending opposite to said first bend for interconnecting said flange to base plate portion of said recess, said flange sloping at an angle from said first bend toward said base plate, and iii) at subsequent stations using an underside surface of said sloping flange to locate said panel for further processing.

2. In a method of claim 1, punching a cut out in said preform base plate portion which defines a lip portion along each of said flanges and defines an arcuate cut out at each corner portion which extends along said rounded corner portions of said preform, each arcuate cut out including a secondary relief cut out extending into said second bend to facilitate further flange bending at subsequent stations without distorting roof panel perimeter edge which defines said sunroof opening.

3. In a method of claim 2, at a subsequent station the step of bending downwardly the flange portion and adjoining lip portion to provide thereby at least a flange portion about the entire periphery of said sunroof opening, said first bend of said preform defining precisely a perimeter edge of said sunroof opening and said flange defining precisely a sidewall of said sunroof opening for engaging a seal portion of sunroof panel perimeter.

4. In a method of claim 3, at a subsequent station assembling said roof panel with a reinforcement ring for said sunroof opening perimeter, said assembly comprising lowering said panel downwardly onto said reinforcement ring whereby said downwardly depending flange and adjoining lip portions guide friction fitting of ring interior opening flange onto said underside surface of said flange adjacent said first bend.

5. In a method of claim 4, at a subsequent station bending said lip portions to slant outwardly of said sunroof opening and under said reinforcement ring interior flange to facilitate insertion of a sunroof panel assembly into said opening.

6. In a method of claim 5, applying an adhesive to a rear portion of said reinforcing ring to secure said rear portion of said ring to said rear edge of said roof panel.

* * * * *